United States Patent [19]

Pesch

[11] 4,412,801

[45] Nov. 1, 1983

[54] PRESSED-BOARD PLANT WITH MULTILEVEL PRESS

[75] Inventor: Jürgen Pesch, Krefeld-Traar, Fed. Rep. of Germany

[73] Assignee: G. Siempelkamp GmbH & Co., Krefeld, Fed. Rep. of Germany

[21] Appl. No.: 259,675

[22] Filed: May 1, 1981

[30] Foreign Application Priority Data

May 2, 1980 [DE] Fed. Rep. of Germany ....... 3016850

[51] Int. Cl.[3] ............................ B29J 5/08; B29C 3/04

[52] U.S. Cl. .................................. 425/338; 100/93 P; 100/137; 100/196; 264/109; 425/406; 425/436 RM; 425/DIG. 200

[58] Field of Search ...................... 425/338, 406, 34 R, 425/436 RM, DIG. 200; 264/109; 100/93 P, 137, 196

[56] References Cited

U.S. PATENT DOCUMENTS

| | | | |
|---|---|---|---|
| Re. 30,759 | 10/1981 | Burkner | 425/406 X |
| 1,908,699 | 5/1933 | Ellis | 425/338 X |
| 2,543,582 | 2/1951 | Lyijynen | 425/338 X |
| 2,728,468 | 12/1955 | Siempelkamp | 100/196 |
| 3,050,200 | 8/1962 | Siempelkamp . | |
| 3,389,625 | 6/1968 | Bruder et al. | 425/338 X |
| 3,565,725 | 2/1971 | Siempelkamp . | |
| 3,611,482 | 10/1971 | Hutz | 425/338 X |
| 3,664,524 | 5/1972 | Yamauchi | 100/196 X |
| 3,810,730 | 5/1974 | Carlsson | 425/338 |
| 3,824,058 | 7/1974 | Axer et al. | 425/338 |
| 3,964,853 | 6/1976 | Fledges et al. | 425/338 |
| 3,966,380 | 6/1976 | Kosik, Jr. | 425/338 |
| 4,065,003 | 12/1977 | Hostettler | 100/196 X |
| 4,350,484 | 9/1982 | Seeger et al. | 425/338 X |

FOREIGN PATENT DOCUMENTS

| | | | |
|---|---|---|---|
| 1653319 | 9/1971 | Fed. Rep. of Germany . | |
| 2236937 | 2/1974 | Fed. Rep. of Germany . | |
| 1273141 | 8/1961 | France | 425/338 |

*Primary Examiner*—Philip E. Anderson

*Attorney, Agent, or Firm*—Karl F. Ross; Herbert Dubno

[57] ABSTRACT

A pressed-board plant having a multi-level press for the pressing of mats of comminuted or fiber material, with or without added binder, to form pressed board, for the lamination of finishing layers to substrates and wherever multi-level presses are applicable, has a multi-level emptying rack adapted to receive the pressed articles on respective press underlays (press trays or sheets). According to the invention, a storage rack for the press underlays is provided with the levels of the storage rack spaced at levels substantially corresponding to those of the press platens in the open condition of the press and from which the underlays are introduced into the press. The storage levels are interspaced with the levels of the emptying rack.

3 Claims, 4 Drawing Figures

PRESSED-BOARD PLANT WITH MULTILEVEL PRESS

FIELD OF THE INVENTION

The present invention relates to a pressed-board plant having a multilevel press and, more particularly, to apparatus for the production, lamination or finishing of pressed board, i.e. particle board, fiber board and laminates in which finishing foils are applied and bonded to substrates.

BACKGROUND OF THE INVENTION

Multilevel presses, which comprise a multiplicity of horizontal press platens disposed between fluid-operated cylinder-and-piston arrangements and a head plate or bed plate, are common in the production of pressed board, the layers of material to be pressed being deposited upon these platens, e.g. on a press underlay of sheet or tray form, so that closure of the press results in compaction to form the pressed product on the underlay.

The platens of the press may be heated to activate a binder which can be incorporated in the material to be pressed or applied between layers to be bonded together.

Simultaneous-closure arrangements can be provided on the press to ensure uniform reduction of the distances between the successive platens during press closure.

Presses and installations of this type are disclosed inter alia in commonly assigned applications Ser. No. 127,572 filed Mar. 6, 1980, now U.S. Pat. No. 4,289,467, Ser. No. 185,181 filed Sept. 8, 1980 and Ser. No. 207,429 filed Nov. 17, 1980, as well as in the U.S. Pat. Nos. 3,565,725, 3,409,942, 3,396,783, 3,332,819, 3,428,505, 3,241,189, 3,050,777, 3,224,758, 3,077,271, 3,050,200, and 3,860,381. Other art dealing with this subject matter can be found in the United States Patent Office Manual of Classification classes and subclasses to which these patents and applications are assigned and in the files thereof.

For the purposes of this disclosure, reference to a multilevel press will mean a press as described above, whether or not equipped with control, simultaneous-closure, heating and cooling and other systems as described in the aforementioned publications and applications. Reference to the production of pressed board in such presses will include the production of particle board and fiber board, with or without added thermally activatable binders, using wood chips, sawdust, cellulosic fibers or other materials commonly utilized in the mats of pressable materials.

It will also include the production of pressed board of any density and thickness, ranging from high strength structural particle board of high density, to low-strength, low-density board suitable primarily for use as insulation.

It will also include production of laminates in which, for example, a decorative or protective foil, e.g. of synthetic resin material may be laminated to a substrate by heat and pressure, the substrate being particle board, for example, or the production of more complex laminates in which, for instance, metal foils, patterning foils or the like are employed with or without embossing of the surface of the laminate.

Reference to press underlays is intended to include the generally thin, relatively flat members in sheet or tray form used heretofore and includes textile underlays, sheet metal underlays, metal screen underlays and like textured or patterned underlays. The sole criteria for an underlay in the sense of the present disclosure is that a layer of pressable material can be deposited thereon and carried by the underlay into the press, the underlay remaining in the press during the pressing operation and the pressed body being thereafter removed e.g. upon the underlay which can be reused.

Multilevel presses or multiplaten presses of the afore-described type have been associated with multilevel discharge racks or frames which are disposed adjacent the press. The pressed products from each level or platen, upon opening of the press is transferred from the press onto a corresponding level of the multilevel emptying or discharge rack.

The discharge rack thus can have its platforms or spaced positioned to correspond, i.e. to be level with, the platens of the press in the open condition thereof while individual board-transfer devices can be associated with each press level to effect the transfer.

It is also known in such systems to store the press underlays after removal of the pressed products and to feed the press underlays back onto the respective press platens.

Interruptions in the operation of the press frequently requires opening of the press to prevent damage to (e.g. burning of) the pressed products.

In earlier systems, the storage device for the press underlays was an independent unit brought into the region of the press when required to accept the underlays upon such interruptions. Such systems are of course expensive and require large amounts of space. They also complicate the control systems for introducing the press underlays into the storage unit.

Mention can be made of rotating underlay storage devices for screen-type underlays which store the screen in a lower pass. All of these arrangements are relatively complicated and prone to breakdown. This applied as well to storage units such as suspended screen magazines. In operation, these devices tend to retard productivity of the plant.

OBJECTS OF THE INVENTION

It is the principal object of the present invention to provide an improved plant for the production of pressed board and like pressed products utilizing press underlays and a multilevel press, but without the disadvantages of earlier systems as enumerated above.

Another object of the invention is to increase the productivity of a pressed-board plant utilizing a multilevel press by eliminating the need to bring the underlay storage unit into and out of position.

Still another object of the invention is to provide improved low-cost storage for pressing underlays in an apparatus for producing pressed board using a multilevel press.

SUMMARY OF THE INVENTION

These objects and others which will become apparent hereinafter are attained, in accordance with the invention, in an apparatus which comprises a multilevel press of the aforedescribed type, a fixed discharge station adjacent this press and comprising a multilevel discharge rack whose levels or platforms correspond to the levels of the platens of the press in an open condition thereof, and a multilevel storage arrangement for the press underlays.

In accordance with the present invention, the storage levels are disposed intermediate the discharge levels of the discharge rack and the devices used to displace the pressed articles onto the discharge rack are also employed for the displacement of the press underlays onto and from the storage levels.

Consequently, the multistage discharge rack is, in accordance with the present invention, also provided with the storage levels which can substantially lie at the corresponding heights of the platens of the press in an open condition thereof.

Where the transfer mechanism is an endless-chain drive with an entrainer engageable with the press underlays, the endless chain units can each have an upper pass and a lower pass, one of these passes carrying the entrainer acting upon the press underlay to carry it onto a discharge platform while on the other pass the entrainer acts to carry the underlay onto the storage platform therebelow.

With the system of the present invention, while the press underlay storage unit is a fixedly positioned assembly of levels, these levels are interleaved with the levels of the discharge rack and thus do not occupy additional floor space.

The underlay storage unit is thus integrated with the multistage discharge rack.

The invention is based upon the discovery that appropriate positioning of the discharge levels of the rack for most multilevel presses, leaves sufficient space between the rack levels to accommodate the underlay-storage platforms.

When the rack is provided with means for raising and lowering same to align the discharge levels with the press platens, the same means is effective for raising and lowering the underlay storage levels. Obviously, the chain utilized to transfer the boards from the press to the discharge levels here also serves a dual function, i.e. is adapted to transfer the press underlay for storage.

BRIEF DESCRIPTION OF THE DRAWING

The above and other objects, features and advantages of the present invention will become more readily apparent from the following description, reference being made to the accompanying, highly diagrammatic drawing in which.

SPECIFIC DESCRIPTION

Figure 1:
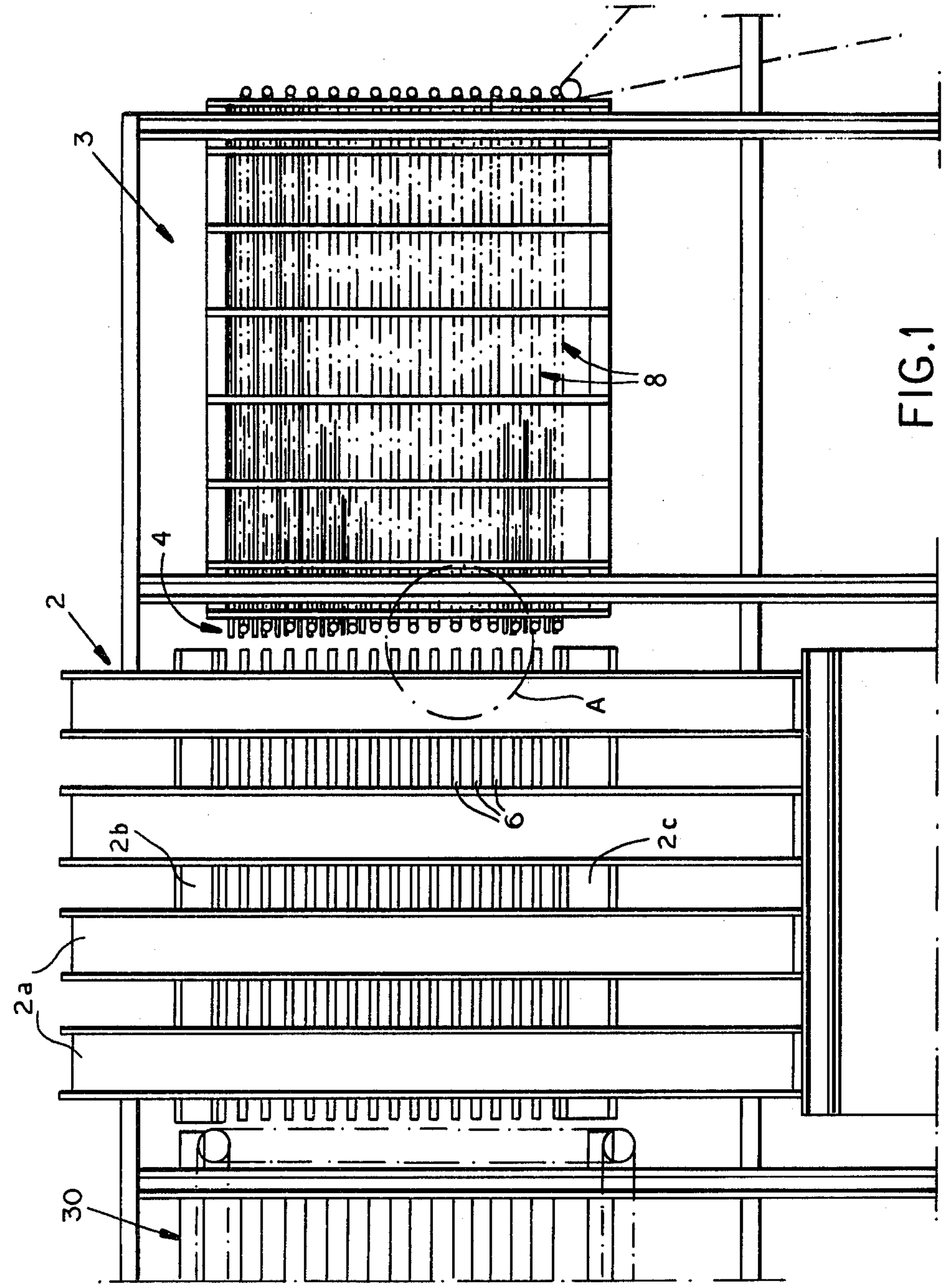
FIG. 1 is a side-elevational view of an apparatus embodying the invention.

As can be seen from FIG. 1, a press installation in accordance with the present invention comprises a multiplaten press 2 adjacent a discharge rack 3.

The multiplaten press comprises, in the usual manner, a number of press frames 2*a* upon which a head plate 2*b* is mounted above a bed plate 2*c* which can be raised and lowered by any conventional fluid-operated means, e.g. hydraulic cylinders, generating the usual press pressures. Between the plates 2*b* and 2*c*, there are provided press platens 6 which can be positioned automatically in equispaced relationship by an automatic closing and opening device as described in the prior art mentioned previously but not shown in the drawing. These platens can be heated, e.g. by passing a heating fluid such as superheated steam through the platens. Electrical heating means of the resistive heating type can also be provided.

On the side of the press opposite the discharge rack 3, is a charging rack 30 of conventional design adapted to feed mats of compressable material on respective press underlays onto the platens 6 of the press.

As has been diagrammatically shown in FIG. 1, the system also includes transfer means represented generally at 4 for transferring the pressed boards 1 on the prespective press underlays 5 from the open multiplaten press into the multilever discharge rack 3.

The rack 3 has its discharge platforms 7 spaced so that the upper surface of each of these platforms is coplanar with the upper surface of a respective platen, i.e. the discharge platforms 7, are level with the corresponding platforms in at least one position of the rack which can be raised and lowered by any rack-displacing device conventional in the art as may be required. The transfer means 4 comprises individual chain drives represented at 8 and consisting of two such chains straddling each of the platforms 7 but provided with entrainers 10 engageable with the projecting ends of a bar 11 connected to each press underlay 5.

Figure 2:
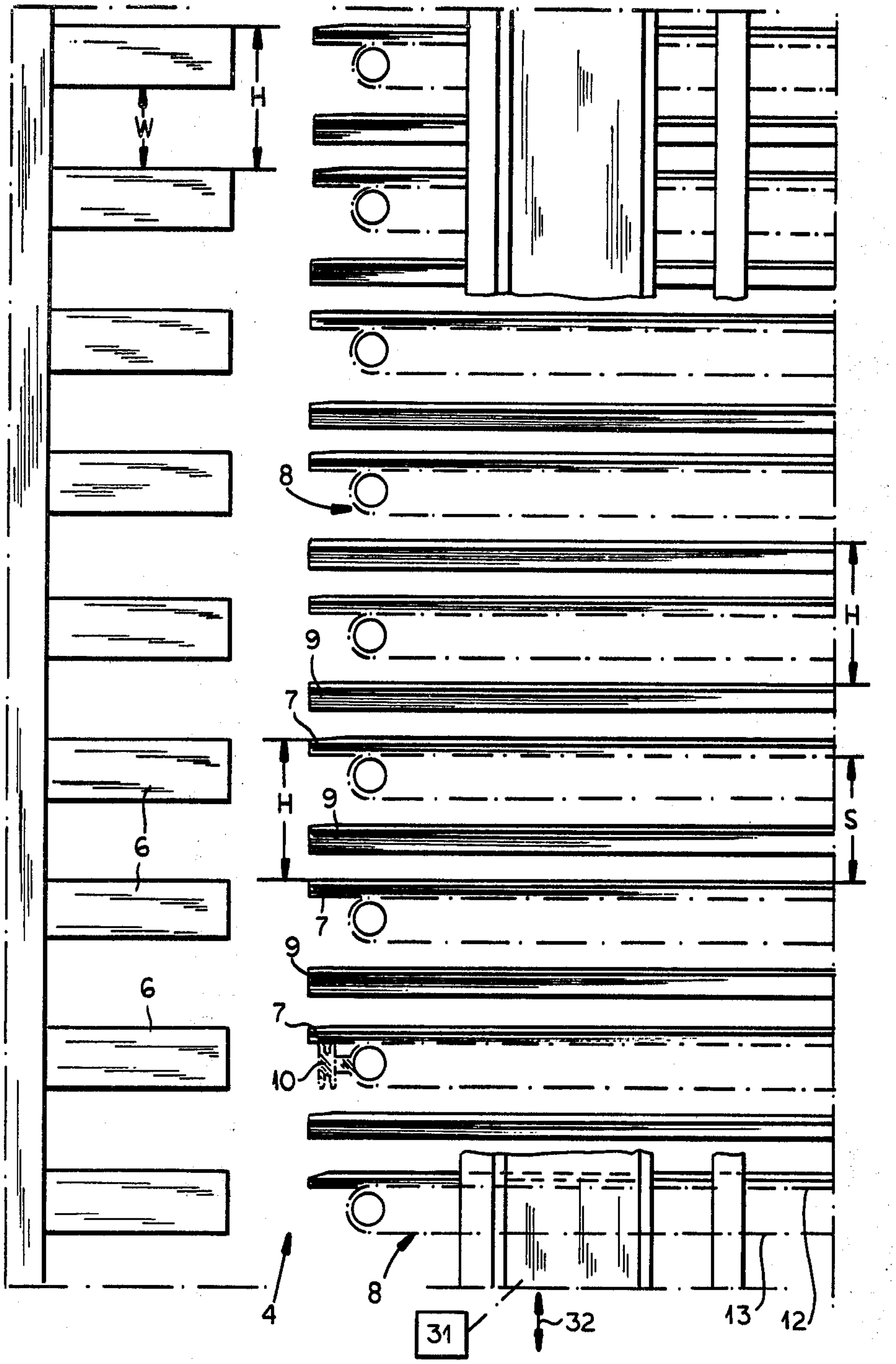
FIG. 2 is a detail view drawn to a larger scale of a portion of the installation of FIG. 1.

From FIG. 2 it will be apparent that, in the open position of the press, the spacing H between the upper surfaces of the press platens will be equal to the corresponding spacing between the upper surface of the platforms 7.

Because of the thicknesses of the platforms (necessary to withstand the pressing force and to enable the platens to contain the heating means) and the relatively considerable width W of the gap between platens necessary to accommodate the uncompressed mat, the space S between platforms 7 is sufficient to accommodate a storage platform 9.

Hence the storage rack is integrated with the discharge rack 3. The upper surface of the storage platforms 9 likewise have the spacing H corresponding to the platen spacing so that a displacement of the rack 3, e.g. by means symbolically shown at 31, can shift the upper surface of the platforms 9 into coplanarity of the upper surfaces of the platens 6 in the open condition of the press. As can be seen from FIG. 3, these storage platforms 9 can also be charged with a press underlay 5 and the respective pressed board 1 by the transfer chain 8 associated with the next underlay discharge platform 7.

Figure 3:
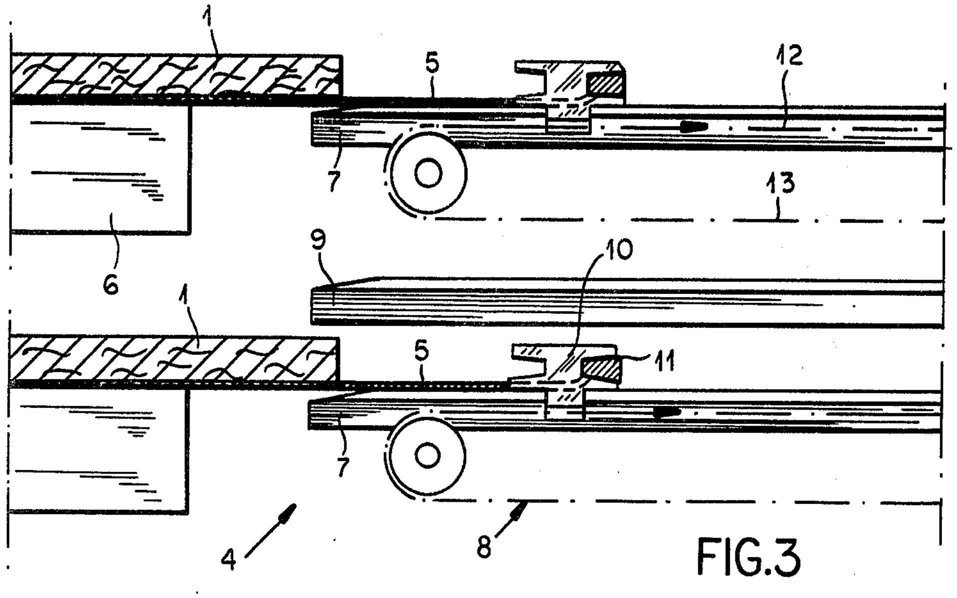
FIG. 3 is a diagram drawn to yet a larger scale showing the transfer chains in one phase of their operation.
Figure 4:
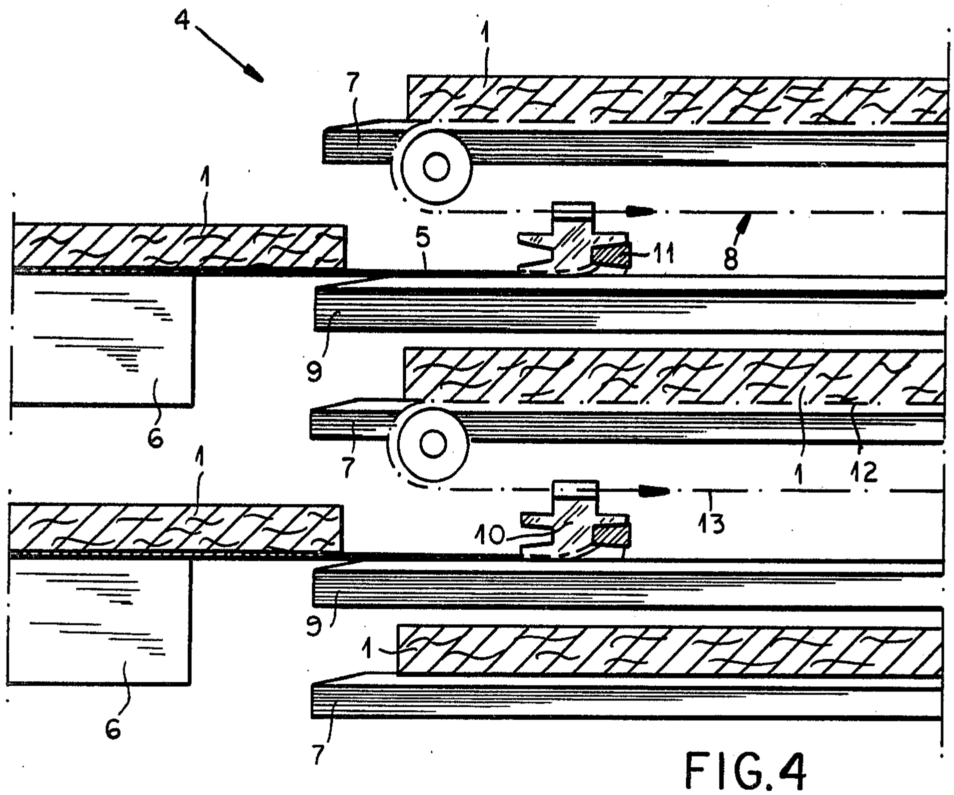
FIG. 4 is a view similar to FIG. 3 showing the transfer chains in another operative phase.

The entrainers 10 of chains 8 can engage the bars 11 of the press underlays 5 as shown in FIGS. 3 and 4 and these chains have an upper pass 12 and a lower pass 13 acts to displace a respective underlay onto the upper platform 7 and the next lower platform 9.

The fact that only fully pressed boards 1 are drawn into the rack 3 further permits accommodation of the storage platforms between the discharge platforms since the thickness of the pressed board is substantially less than that of the mat to be pressed.

As a result, discharge racks of conventional design can be readily modified to accommodate the storage platforms and modification of the press and other units of the installation is not required.

FIGS. 3 and 4 show in detail the transfer function of the chain drive 8. The chain drive 8 is constructed such that each entrainer 10 can draw the press underlay onto an upper discharge platform or onto the lower storage platform. The chain can have a rest position at which an entrainer 10 is shown in dot-dash lines in FIG. 2, from which the chain can selectively deposit the underlay on a platform 7 or platform 9.

After a normal press operation, the chains have drawn a finished board 1 on its underlay 5 onto the platforms 7, and the chain returns to its starting or rest position.

Should production be interrupted for some reason and it be imparted to empty the press, the rack 3 is shifted (arrow 32) to the position shown in FIGS. 2 and 4 and the chains are driven in the opposite sense to draw the pressed boards 1 on the respective underlays 5 onto the platforms 9. Generally an additional displacement of the press underlays to more than toward the rack 3 is required for proper engagement and this can be achieved by providing swingable arms on rotatable columns with rollers at the ends of these arms to push the bars 11 toward the rack 3.

After storage of the pressed product on the platforms 9, the normal sequence of operations can be resumed or the boards on these platforms can be fed back into the press for further pressing if desired.

If the production remains at standstill for a prolonged period, the rack 3 can also remain at standstill until production begins again. If the pressing of the boards on platform 9 was sufficient, then the boards are discharged from the platform after those on platforms 7 are discharged in the conventional manner.

I claim:

1. In an apparatus for the production of pressed board wherein pressable materials on respective press underlays are pressed between the platens of a multiplaten press, and pressed boards on respective press underlays are transferred to discharge platforms of a discharge rack adjoining the press, the discharge platforms being disposed substantially at levels corresponding to the levels of the platens of said press in an open condition thereof, said discharge rack having transfer means for transferring the boards on the respective underlays, the improvement wherein said rack is provided with a multiplicity of storage platforms interleaved with said discharge platforms and spaced apart corresponding to the spacing of the upper surfaces of said platforms, said transfer means being operable selectively to transfer said pressed boards on respective underlays onto said discharge platforms and onto said storage platforms, and means for shifting said rack between one rack position in which the upper surfaces of said discharge platforms are coplanar with the upper surfaces of respective platens and another rack position in which the upper surfaces of said storage platforms are coplanar with respective platens.

2. The improvement defined in claim 1 wherein said transfer means includes endless chain means associated with each of said discharge platforms and provided with an entrainer operable along one pass of said chain means to draw a respective pressed board and underlay onto said discharge platform and along another pass of said chain means to draw a pressed board on a respective underlay onto a respective one of said storage platforms.

3. The improvement defined in claim 2 wherein each chain means has an upper pass and a lower pass, the entrainer of each chain means drawing a pressed board on a respective underlay onto a respective discharge platform along said upper pass of the respective chain means.

* * * * *